US012290192B1

(12) United States Patent
Newland et al.

(10) Patent No.: US 12,290,192 B1
(45) Date of Patent: May 6, 2025

(54) CONCENTRIC HANDLE FOR HOLDING KNIFE INSIDE JAR

(71) Applicants: Ryan P Newland, Barrington, IL (US); Steven L Silvey, Vancouver, WA (US)

(72) Inventors: Ryan P Newland, Barrington, IL (US); Steven L Silvey, Vancouver, WA (US)

(73) Assignee: Ryan Newland, Barrington, IL (US)

( * ) Notice: Subject to any disclaimer, the term of this patent is extended or adjusted under 35 U.S.C. 154(b) by 0 days.

(21) Appl. No.: 18/665,528

(22) Filed: May 15, 2024

(51) Int. Cl.
*A47G 21/14* (2006.01)
*B26B 3/00* (2006.01)
*B65D 43/02* (2006.01)
*B65D 51/18* (2006.01)
*B65D 51/32* (2006.01)
*B65D 53/02* (2006.01)

(52) U.S. Cl.
CPC .............. *A47G 21/145* (2013.01); *B26B 3/00* (2013.01); *B65D 43/0231* (2013.01); *B65D 51/18* (2013.01); *B65D 51/32* (2013.01); *B65D 53/02* (2013.01); *B65D 2251/0018* (2013.01); *B65D 2251/0093* (2013.01); *B65D 2543/00092* (2013.01); *B65D 2543/00527* (2013.01); *B65D 2543/00537* (2013.01); *B65D 2543/00972* (2013.01)

(58) Field of Classification Search
None
See application file for complete search history.

(56) References Cited

U.S. PATENT DOCUMENTS

| | | | |
|---|---|---|---|
| 277,467 | A | 6/1883 | Quillfeldt |
| 317,950 | A | 5/1885 | Lilly |
| 787,986 | A | 4/1905 | Keliher |
| 1,017,753 | A | 2/1912 | Harrison |
| 1,021,004 | A | 5/1912 | Sanford |
| 1,327,439 | A | 6/1920 | Lewis |

(Continued)

FOREIGN PATENT DOCUMENTS

| | | | |
|---|---|---|---|
| BE | 1007748 | A3 | 10/1995 |
| DE | 2738960 | A1 | 3/1979 |

(Continued)

OTHER PUBLICATIONS

FR2881634A1 Xavier EPO translation to English Aug. 11, 2006.

(Continued)

*Primary Examiner* — Hwei-Siu C Payer
(74) *Attorney, Agent, or Firm* — Patents and Licensing LLC; Daniel W Juffernbruch

(57) ABSTRACT

A concentric handle for hand spreading is held in a container. A circular disc is shaped to be concentrically press fit into a circular top mouth opening of the container. The circular disc forms a handle for grasping by fingers of a user. A spreader is integrally formed in the disc extending downward. An upper outer flanged circular ring is integrally formed in the disc to prevent the disc from fitting too deeply into the circular top mouth opening. A lower seal beneath the upper outer flanged circular ring extends around a lower perimeter of the circular disc and positioned between the circular disc and a top edge of the circular top mouth opening of the container. The lower seal can have a grab tab. The circular disc can have a vent hole and a flexible membrane fixed over the vent hole.

18 Claims, 17 Drawing Sheets

(56) References Cited

U.S. PATENT DOCUMENTS

| | | | | |
|---|---|---|---|---|
| 1,383,603 | A | 7/1921 | Craig | |
| 1,834,085 | A | 12/1928 | Bloom | |
| 1,875,379 | A | 9/1930 | Holmes | |
| 1,840,662 | A | 1/1932 | Fischer | |
| 2,124,929 | A | 8/1935 | Reid | |
| 2,149,698 | A | 3/1939 | Humphrey | |
| 2,175,735 | A * | 10/1939 | Banks | B65D 77/283 215/388 |
| 2,665,029 | A | 3/1951 | Horrocks | |
| 2,738,900 | A | 2/1954 | Wegner | |
| 2,803,030 | A | 4/1954 | Florio | |
| 2,920,779 | A | 10/1956 | Armitage | |
| 3,022,916 | A | 9/1960 | Spooner | |
| 3,144,152 | A | 8/1964 | Kopp | |
| 3,955,742 | A | 5/1976 | Marshall | |
| 4,001,444 | A | 1/1977 | Clarke | |
| 4,095,716 | A | 6/1978 | Meany | |
| 4,219,283 | A | 8/1980 | Buckley | |
| 4,423,687 | A | 1/1984 | Serra | |
| 4,717,032 | A | 1/1988 | Wu | |
| D302,793 | S | 8/1989 | Yamaguchi | |
| 4,942,663 | A | 7/1990 | Ray | |
| 5,146,684 | A | 9/1992 | Hagler | |
| 5,211,322 | A | 5/1993 | Nealy | |
| 5,236,022 | A | 8/1993 | Husted | |
| 5,251,774 | A | 10/1993 | Engle | |
| 5,291,992 | A | 3/1994 | Olvetti | |
| 5,586,676 | A | 12/1996 | Lynd | |
| 5,738,242 | A | 4/1998 | Paris | |
| 5,775,531 | A * | 7/1998 | Lowry | B65D 51/246 220/212.5 |
| 6,578,725 | B2 | 6/2003 | Delman | |
| 6,772,904 | B1 | 8/2004 | Gilliam | |
| 7,464,475 | B2 | 12/2008 | Tsao | |
| 7,770,745 | B2 | 8/2010 | Weissmann | |
| D674,669 | S | 1/2013 | Gerli | |
| 8,740,012 | B2 | 6/2014 | Ekkert | |
| 8,839,522 | B2 | 9/2014 | Walters | |
| 10,376,080 | B1 | 8/2019 | Newland | |
| 11,647,853 | B1 | 5/2023 | Newland | |
| 2005/0029276 | A1 | 2/2005 | Johnson | |
| 2005/0260026 | A1 | 11/2005 | Kessler | |
| 2006/0249639 | A1 | 11/2006 | Bisceglia | |
| 2007/0170188 | A1 | 7/2007 | Guillaume | |
| 2007/0266569 | A1 | 11/2007 | Nenadic | |
| 2008/0149637 | A1 | 6/2008 | Hanafusa | |
| 2008/0217333 | A1 | 9/2008 | Mayo | |
| 2008/0217335 | A1 * | 9/2008 | Chen | B65D 81/2038 220/231 |
| 2009/0261113 | A1 | 10/2009 | Miota | |
| 2009/0277902 | A1 | 11/2009 | Darflinger | |
| 2009/0289070 | A1 | 11/2009 | Costa | |
| 2009/0293898 | A1 | 12/2009 | Young | |
| 2009/0321478 | A1 | 12/2009 | Juteau | |
| 2012/0223077 | A1 * | 9/2012 | Claypool | B65D 55/02 220/315 |
| 2012/0285845 | A1 | 11/2012 | Jackson | |
| 2014/0299567 | A1 | 10/2014 | Vogel | |
| 2016/0288352 | A1 | 10/2016 | Squiers | |
| 2017/0043493 | A1 | 2/2017 | Seber | |
| 2018/0022505 | A1 | 1/2018 | Herlin | |
| 2018/0192802 | A1 | 6/2018 | Johnson | |
| 2018/0186540 | A1 | 7/2018 | VanDamme | |
| 2018/0257839 | A1 | 9/2018 | Chevalley | |
| 2019/0054642 | A1 | 2/2019 | Wu | |
| 2019/0152675 | A1 * | 5/2019 | He | B65D 43/022 |
| 2019/0276208 | A1 | 9/2019 | Becker | |
| 2021/0331844 | A1 | 10/2021 | Yan | |

FOREIGN PATENT DOCUMENTS

| | | | | |
|---|---|---|---|---|
| DE | 3629718 | A1 | 3/1988 | |
| DE | 3900335 | A1 | 8/1989 | |
| DE | 3940429 | A1 | 6/1991 | |
| DE | 29602339 | U1 | 4/1996 | |
| DE | 19718043 | A1 | 11/1998 | |
| DE | 19718310 | A1 | 11/1998 | |
| DE | 29817273 | U1 | 12/1998 | |
| DE | 19940739 | A1 | 12/2000 | |
| EP | 0856274 | A1 | 8/1998 | |
| EP | 0922650 | A1 | 6/1999 | |
| FR | 2881634 | A1 | 8/2006 | |
| FR | 2905581 | A1 | 3/2008 | |
| GB | 269328 | A | 4/1927 | |
| JP | 2003230475 | A | 8/2003 | |
| WO | WO2000048721 | A1 | 8/2000 | |
| WO | 2005037678 | A1 | 4/2005 | |
| WO | WO-2007133175 | A2 * | 11/2007 | A47J 36/06 |
| WO | 2008041808 | A1 | 4/2008 | |
| WO | WO2009072874 | A1 | 6/2009 | |
| WO | WO2013104780 | A1 | 7/2013 | |
| WO | 2015065818 | A1 | 5/2015 | |
| WO | 2016203287 | A1 | 12/2016 | |
| WO | 2017045086 | A1 | 3/2017 | |
| WO | 2017155453 | A1 | 9/2017 | |

OTHER PUBLICATIONS

WO2017045086 English Abstract Mar. 23, 2017.
English Abstract for BE1007748A3.
English Abstract for DE2738960A1.
English Abstract for DE3629718A1.
English Abstract for DE3900335A1.
English Abstract for DE3940429A1.
English Abstract for DE19718043A1.
English Abstract for DE19718310A1.
English Abstract for DE19940739A1.
English Abstract for DE29817273U1.
English Abstract for JP2003230475A.
English Abstract for EP0922650A1.
English Translation for WO2000048721A1.

* cited by examiner

CONCENTRIC HANDLE FOR HOLDING KNIFE INSIDE JAR

CROSS-REFERENCE TO RELATED PATENTS

The present inventions are related to the subject matter of U.S. Pat. No. 10,376,080 granted on Aug. 13, 2019 and first filed on Apr. 28, 2017 by Ryan P Newland and entitled JAR WITH KNIFE SHEATH UNDER LID and patent Ser. No. 11,647,853 granted on May 16, 2023 and first filed on Aug. 11, 2020 by Ryan P Newland and entitled JAR WITH KNIFE SHEATH UNDER LID.

BACKGROUND OF THE INVENTIONS

1. Technical Field

The present inventions relate to container accessories and, more particularly, relate to adaptations for holding utensils inside jars.

2. Description of the Related Art

Typically food jars are stored in a kitchen refrigerator and knifes are stored in a kitchen drawer. Assembling food such as sandwiches require taking a knife from a drawer to spread the food from the jar on bread. Then the knife needs to be washed and returned to the drawer. A next food assembly at another time repeats this process.

What is needed is an apparatus for a more streamlined way of assembling food such as making a sandwich.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
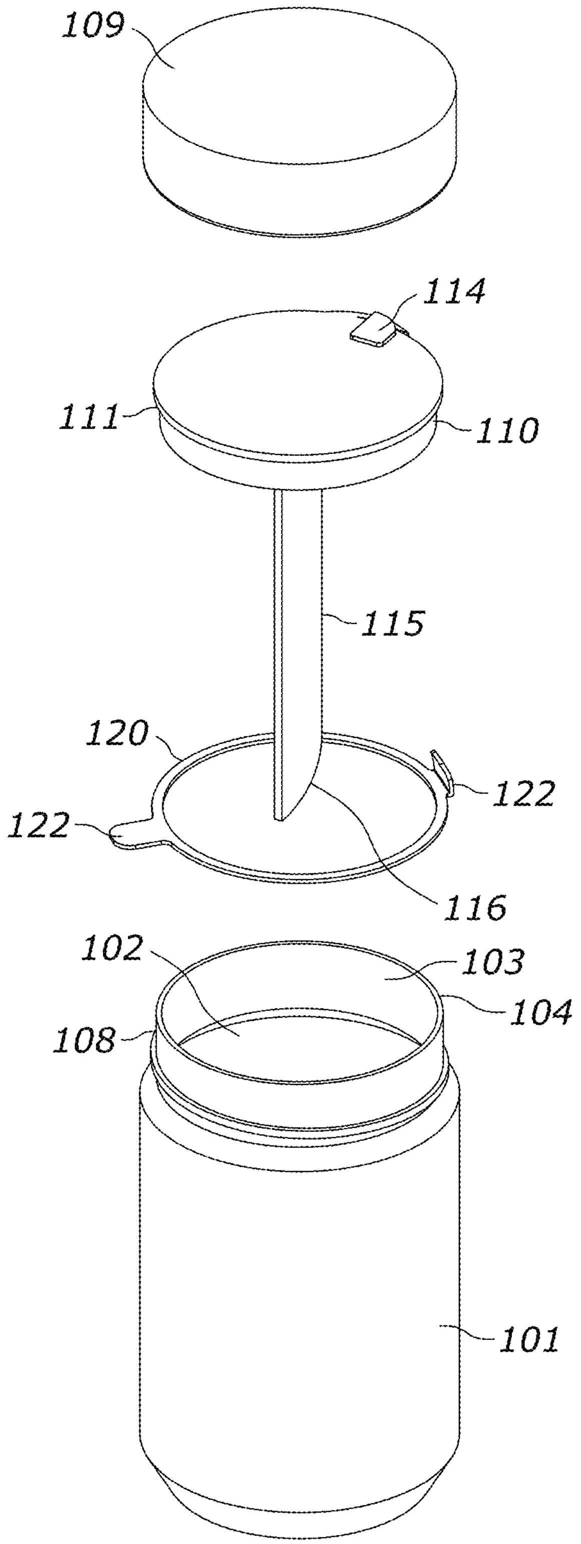
FIG. 1 illustrates an exploded perspective view of a concentric handle held in a container a first embodiment of the present inventions.

FIG. 1 illustrates an exploded perspective view of a concentric handle held in a container a first embodiment of the present inventions. A concentric handle is held in a container 101. A circular disc 110 is concentrically fit into a circular top mouth opening 102 of an inside annular surface 103 of a container 101. The circular disc 110 is sized to be loosely fit into the circular top mouth opening 102 of the inside annular surface 103 of the container 101. The container 101 has threads 108 that mesh with a threaded screw on lid 109. In the first embodiment illustrated in FIG. 1, the circular disc 110 is a solid disc without any venting by holes. An outside perimeter of the circular disc 110 forms a handle for grasping by fingers of a user.

The circular disc has a spreader of a substantially flat shape integrally formed in the circular disc 110 and downwardly extending from the circular disc 110 to a bottom tip 116 of the spreader 115. An upper outer flanged circular ring 111 is integrally formed in the circular disc 110 to prevent the circular disc from press fitting too deeply into the circular top mouth opening 102 of the container 101. The circular disc 110 can have a grab tab 114. The grab tab 114 has a fold to fit under the threaded screw on lid 109 of the container 101. The fold of the grab tab 114 extends beyond an outer perimeter of the circular disc no further than a thread depth of the threaded screw on lid 109 and threads 108 on the container to avoid interference when screwing the lid onto the container.

A lower seal 120 is placed beneath the upper outer flanged circular ring 111 and extends around a lower perimeter of the circular disc 110 positioned between the circular disc 110 and a top edge 104 of the circular top mouth opening 102 of the container 101. The lower seal 120 can have at least one more grab tab 122. The lower seal 120 uses a sticky adhesive material. The lower seal 120 can be a rubber or sticky food-grade material such as an FDA approved or food-grade adhesive. The lower seal 120 can have an adhesive on both sides so as to create the seal. The lower seal 120 material could be a PET, also known as polyethylene terephthalate, a type of thermoplastic polymer resin.

Figure 2:
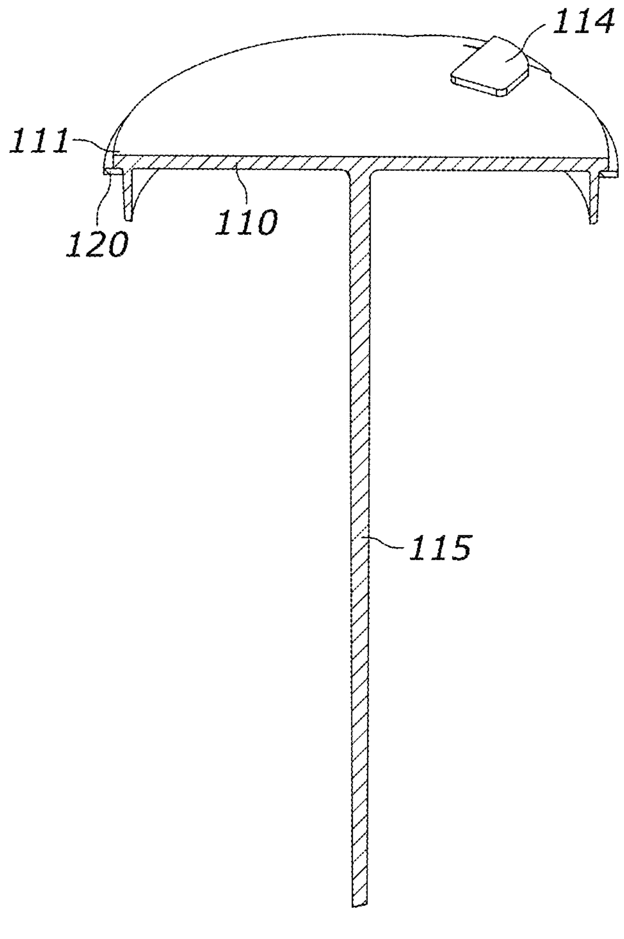
FIG. 2 illustrates a cutaway perspective view of the circular disc with integral knife according to the first embodiment of the present inventions.

FIG. 2 illustrates a cutaway perspective view of the circular disc with integral knife according to the first embodiment of the present inventions. The circular disc has a spreader of a substantially flat shape integrally formed in the circular disc 110 and downwardly extending from the circular disc 110 to a bottom tip of the spreader 115. An upper outer flanged circular ring 111 is integrally formed in the circular disc 110 to prevent the circular disc from press fitting too deeply into the circular top mouth opening 102 of the container 101. The circular disc 110 can have a grab tab 114. The grab tab 114 has a fold to fit under the threaded screw on lid 109 of the container. The fold of the grab tab 114 extends beyond an outer perimeter of the circular disc no further than a thread depth of the threaded screw on lid and the container to avoid interference when screwing the lid onto the container. A lower seal 120 is placed beneath the upper outer flanged circular ring 111 and extends around a lower perimeter of the circular disc 110.

Figure 3:
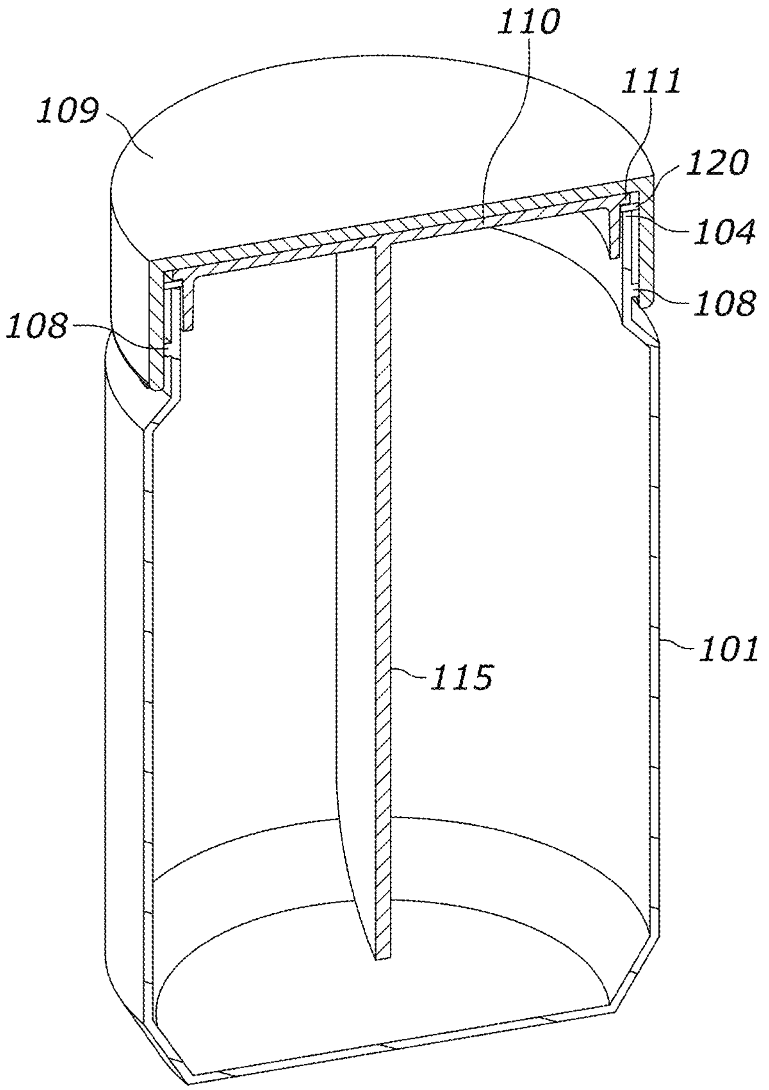
FIG. 3 illustrates a cutaway perspective view of the concentric handle held in a container according to the first embodiment of the present inventions.

FIG. 3 illustrates a cutaway perspective view of the concentric handle held in a container according to the first embodiment of the present inventions. A circular disc 110 is concentrically fit into a circular top mouth opening 102 of an inside annular surface 103 of a container 101. The container 101 has threads 108 that mesh with a threaded screw on lid 109. The circular disc 101 forms a handle for grasping by fingers of a user.

The circular disc has a spreader of a substantially flat shape integrally formed in the circular disc 110 and downwardly extending from the circular disc 110 to a bottom tip 116 of the spreader 115. An upper outer flanged circular ring 111 is integrally formed in the circular disc 110 to prevent the circular disc from press fitting too deeply into the circular top mouth opening 102 of the container 101.

A lower seal 120 is placed beneath the upper outer flanged circular ring 111 and extends around a lower perimeter of the circular disc 110 positioned between the circular disc 110 and a top edge 104 of the circular top mouth opening 102 of the container 101.

Figure 4:
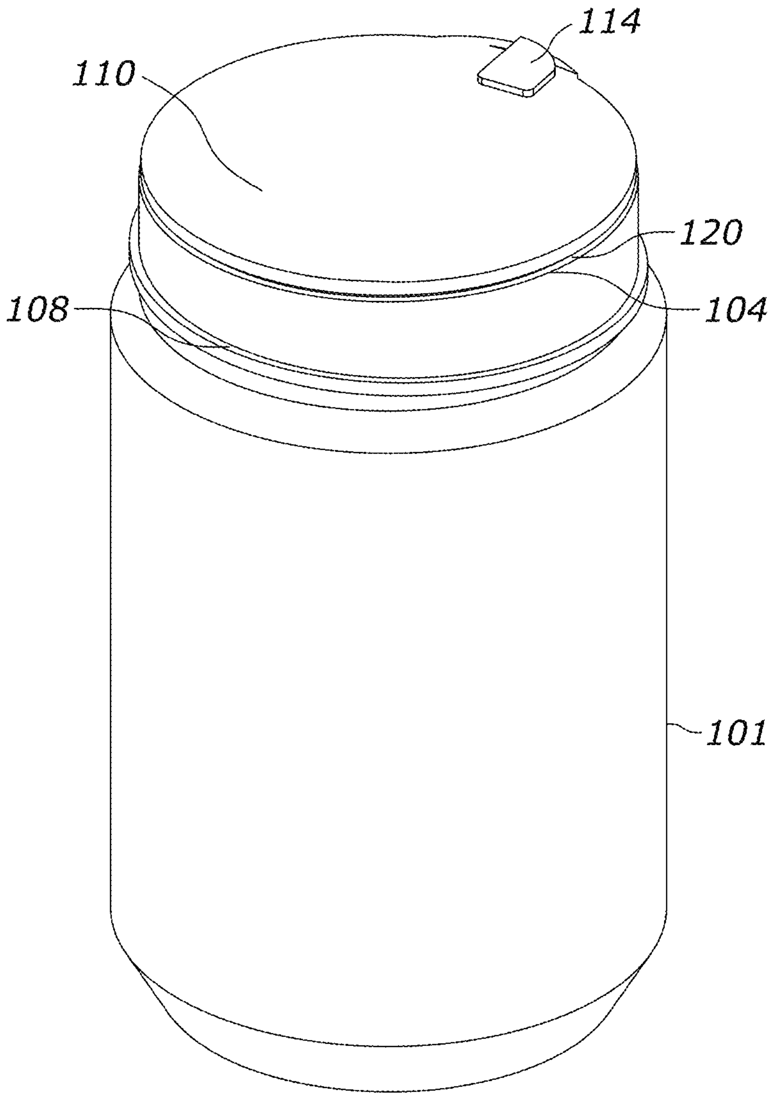
FIG. 4 illustrates a perspective view of the concentric handle held in a container according to the first embodiment of the present inventions.

FIG. 4 illustrates a perspective view of the concentric handle held in a container according to the first embodiment of the present inventions. A circular disc 110 is concentrically fit into a circular top mouth opening of a container 101. The container 101 has threads 108 that mesh with a threaded screw on lid. The circular disc 110 forms a handle for grasping by fingers of a user.

The circular disc 110 can have a grab tab 114. The grab tab 114 has a fold to fit under the threaded screw on lid 109 of the container 101. The fold of the grab tab 114 extends beyond an outer perimeter of the circular disc no further than a thread depth of the threaded screw on lid and threads 108 on the container to avoid interference when screwing the lid onto the container.

A lower seal 120 is placed beneath the upper outer flanged circular ring and extends around a lower perimeter of the circular disc 110 positioned between the circular disc 110 and a top edge 104 of the circular top mouth opening of the container 101.

Figure 5:
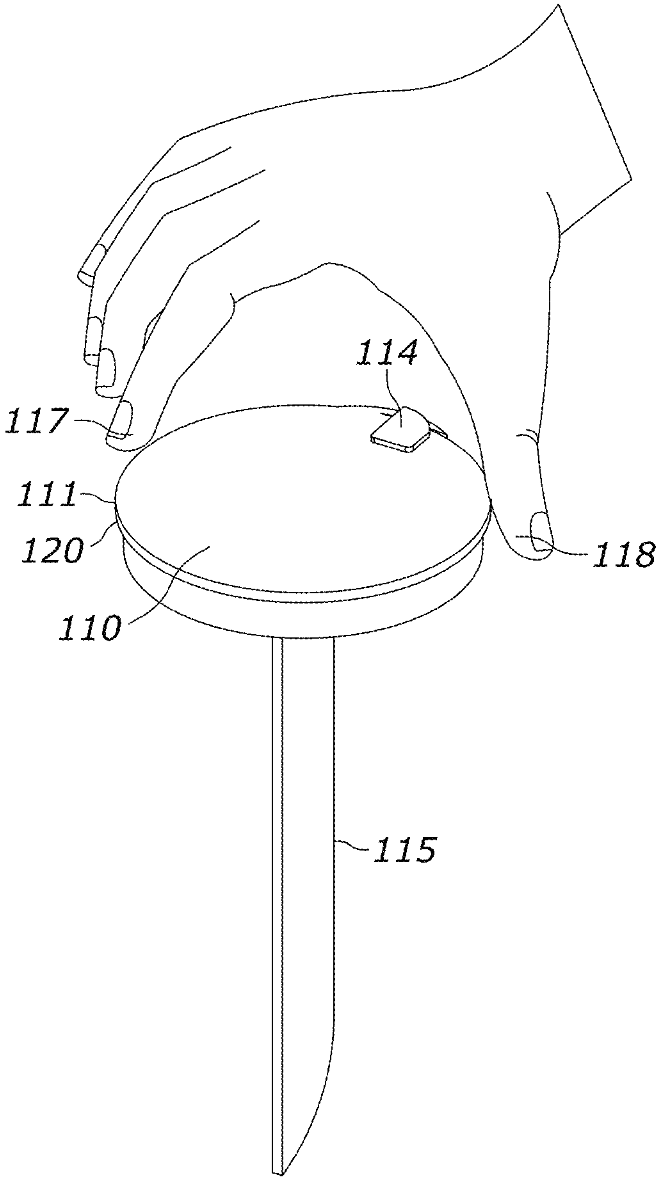
FIG. 5 illustrates a perspective view of the concentric handle formed by the circular disc with integral knife held between finger and thumb by a user according to the first embodiment of the present inventions.

FIG. 5 illustrates a perspective view of the concentric handle formed by the circular disc with integral knife held between finger and thumb by a user according to the first embodiment of the present inventions. A concentric handle is formed by an outer circumference of a circular disc 110. The circular disc 110 is held by an index finger 117 and thumb 118 of a user's hand as illustrated.

The circular disc 110 can have a grab tab 114. The grab tab 114 has a fold to fit under the threaded screw on lid 109 of the container. Also, tabs such as the grab tab 114 can be pulled by an index finger 117 and thumb 118 of a user's hand to break the seal between the circular disc 110 and the container 101.

The circular disc 110 has a spreader 115 of a substantially flat shape integrally formed in the circular disc 110 and downwardly extending from the circular disc 110 to a bottom tip of the spreader. An upper outer flanged circular ring 111 is integrally formed in the circular disc 110 to prevent the circular disc from press fitting too deeply into the circular top mouth opening of the container.

Figure 6:
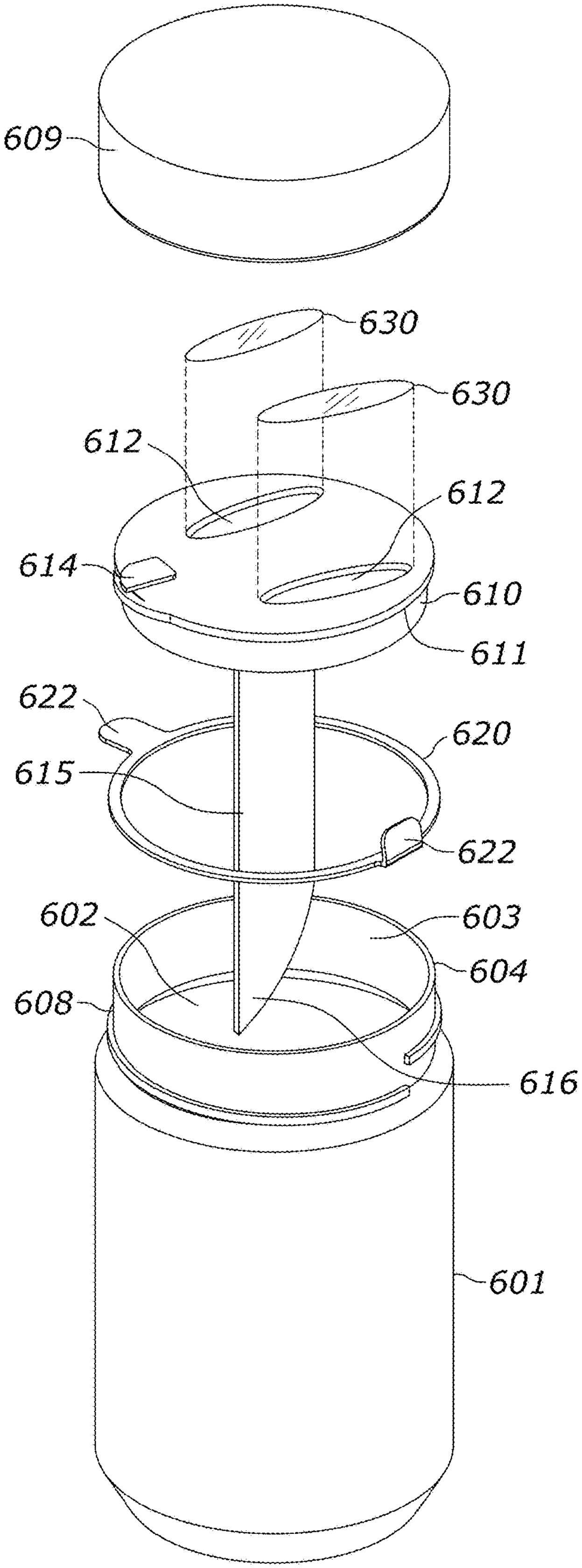
FIG. 6 illustrates an exploded perspective view of a concentric handle held in a container according to a first variant in a second embodiment of the present inventions.

FIG. 6 illustrates an exploded perspective view of a concentric handle held in a container according to a first variant in a second embodiment of the present inventions. A circular disc 610 is concentrically fit into a circular top mouth opening 602 of an inside annular surface 603 of a container 601. The circular disc 610 is sized to be loosely fit into the circular top mouth opening 602 of the inside annular surface 603 of the container 601. The container 601 has threads 608 and a threaded screw on lid 609. An outside perimeter of the circular disc 610 forms a handle for grasping by fingers of a user.

A spreader 615 of a substantially flat shape is integrally formed in the same material as the circular disc 610 and extends downward from the circular disc 610 to a bottom tip 616 of the spreader 615.

An upper outer flanged circular ring 611 is integrally formed with the circular disc 610 to prevent the circular disc from press fitting too deeply into the circular top mouth opening 602.

The circular disc 610 can have a grab tab 614. The grab tab 614 has a fold to fit under a threaded screw on lid 609 of the container 601. The fold of the grab tab 614 extends beyond an outer perimeter of the circular disc no further than a thread depth of the threaded screw on lid 609 and the container 601 to avoid interference when screwing the lid onto the container.

A lower seal 620 beneath the upper outer flanged circular ring 611 extends around a lower perimeter of the circular disc 610 and is positioned between the circular disc 610 and a top edge 604 of the circular top mouth opening 602 of the container 601. The lower seal 620 is beneath the upper outer flanged circular ring 611 and extends around a lower perimeter of the circular disc 610 and positioned between the circular disc 610 and a top edge 604 of the circular top mouth opening 602 of the container 601. The lower seal 620 can have at least one grab tab 622. The lower seal 620 uses a sticky adhesive material. The lower seal 620 can be a rubber or sticky food-grade material such as an FDA approved or food-grade adhesive. The lower seal 620 can have an adhesive on both sides so as to create the seal. The lower seal 620 material could be a PET, also known as polyethylene terephthalate, a type of thermoplastic polymer resin.

The circular disc 610 has at least one oval vent hole 612. Flexible membranes 630 are fixed over respective oval vent holes 612. The flexible membranes 630 can be of a material based on polypropylene and coated or multi-material which have the approval of FDA or is food grade, and prevention of transmission of gases. The flexible membraned 630 have a sticky lower part such as an FDA approved or food grade adhesive to stick to the top of the circular disc 610. The circular disc 610 can have a concave top surface providing an air gap between the vent hole 611 and the flexible membrane 630.

Figure 7:
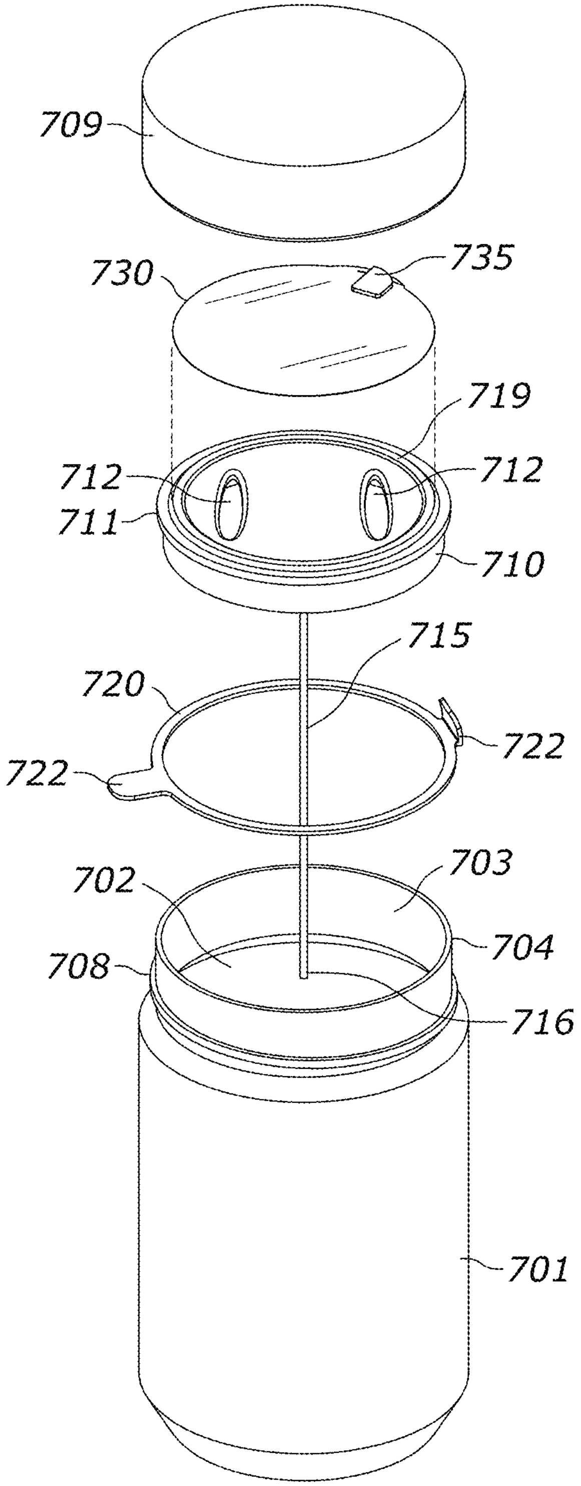
FIG. 7 illustrates an exploded perspective view of a concentric handle held in a container according to a second variant in a second embodiment of the present inventions.

FIG. 7 illustrates an exploded perspective view of a concentric handle held in a container according to a second variant in a second embodiment of the present inventions. A circular disc 710 is concentrically fit into a circular top mouth opening 702 of an inside annular surface 703 of a container 701. The circular disc 710 is sized to be loosely fit into the circular top mouth opening 702 of the inside annular surface 703 of the container 701. The container 701 has threads 708 and a threaded screw on lid 709. An outside perimeter of the circular disc 710 forms a handle for grasping by fingers of a user.

A spreader 715 of a substantially flat shape is integrally formed in the same material as the circular disc 710 and extends downward from the circular disc 710 to a bottom tip 716 of the spreader 715.

An upper outer flanged circular ring 711 is integrally formed in the circular disc 710 to prevent the circular disc from press fitting too deeply into the circular top mouth opening 702.

A lower seal 720 beneath the upper outer flanged circular ring 711 extends around a lower perimeter of the circular disc 710 and is positioned between the circular disc 710 and a top edge 704 of the circular top mouth opening 702 of the container 701. The lower seal 720 is beneath the upper outer flanged circular ring 711 and extends around a lower perimeter of the circular disc 710 and positioned between the circular disc 710 and a top edge 704 of the circular top mouth opening 702 of the container 701. The lower seal 720 can have at least one grab tab 722. The lower seal 720 uses a sticky adhesive material. The lower seal 720 can be a rubber or sticky food-grade material such as an FDA approved or food-grade adhesive. The lower seal 720 can have an adhesive on both sides so as to create the seal. The lower seal 720 material could be a PET, also known as polyethylene terephthalate, a type of thermoplastic polymer resin.

The circular disc 710 has at two vent holes 712.

A flexible membrane 730 is fixed over the vent holes 712. One or more than two vent holes 712 can be used, so long as the upper membrane has enough space to move an indicate a proper seal. The flexible membrane 730 can be a material based on polypropylene and coated or multi-material which have the approval of FDA approved or food grade, and prevention of transmission of gases. The flexible membrane 730 has a sticky lower part such as an FDA approved or food grade adhesive to stick to the top of the circular disc 710. A protruding ridge 719 can be provided to mesh with the flexible membrane 730 and provide an air gap between the vent hole 712 and the flexible membrane 730. The circular disc 710 can have a concave top surface providing an air gap between the vent hole 712 and the flexible membrane 730

The flexible membrane 730 can have a grab tab 735 for breaking the seal.

Figure 8:
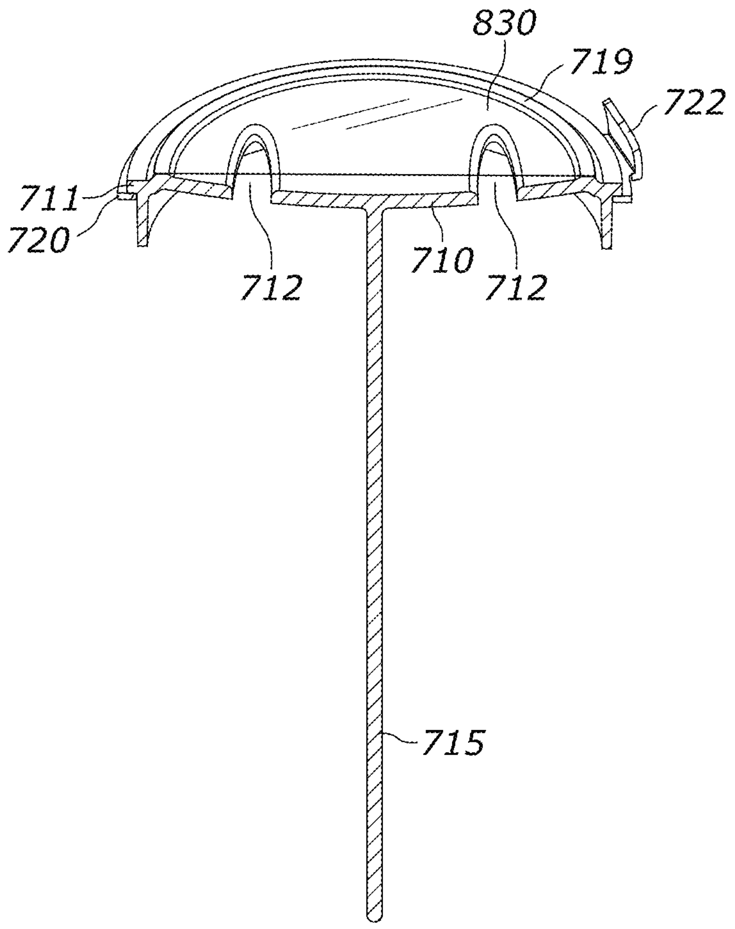
FIG. 8 illustrates a cutaway perspective view of the circular disc with integral knife according to the second embodiment of the present inventions.

FIG. 8 illustrates a cutaway perspective view of the circular disc with integral knife according to the first-second embodiment of the present inventions. The circular disc 710 has vent holes 712 and an integral spreader 715. A flexible membrane 830 is fixed over the vent holes 712. A protruding ridge 719 can be provided to mesh with the flexible membrane 830 and provide an air gap between the vent holes 712 and the flexible membrane 830. The circular disc 710 can have a concave top surface providing an air gap between the vent holes 712 and the flexible membrane 830. An upper outer flanged circular ring 711 is integrally formed in the circular disc 710 to prevent the circular disc from press fitting too deeply into the circular top mouth opening of the container.

A lower seal 720 beneath the upper outer flanged circular ring 711 extends around a lower perimeter of the circular disc 710 and is positioned between the circular disc 710 and a top edge of the circular top mouth opening of the container. The lower seal 720 is beneath the upper outer flanged circular ring 711 and extends around a lower perimeter of the circular disc 710 positioned between the circular disc 710 and a top edge 704 of the circular top mouth opening of the container. The lower seal 720 can have at least one grab tab 722. The grab tab 722 can be folded to fit under a threaded screw on lid of the container.

Figure 9:
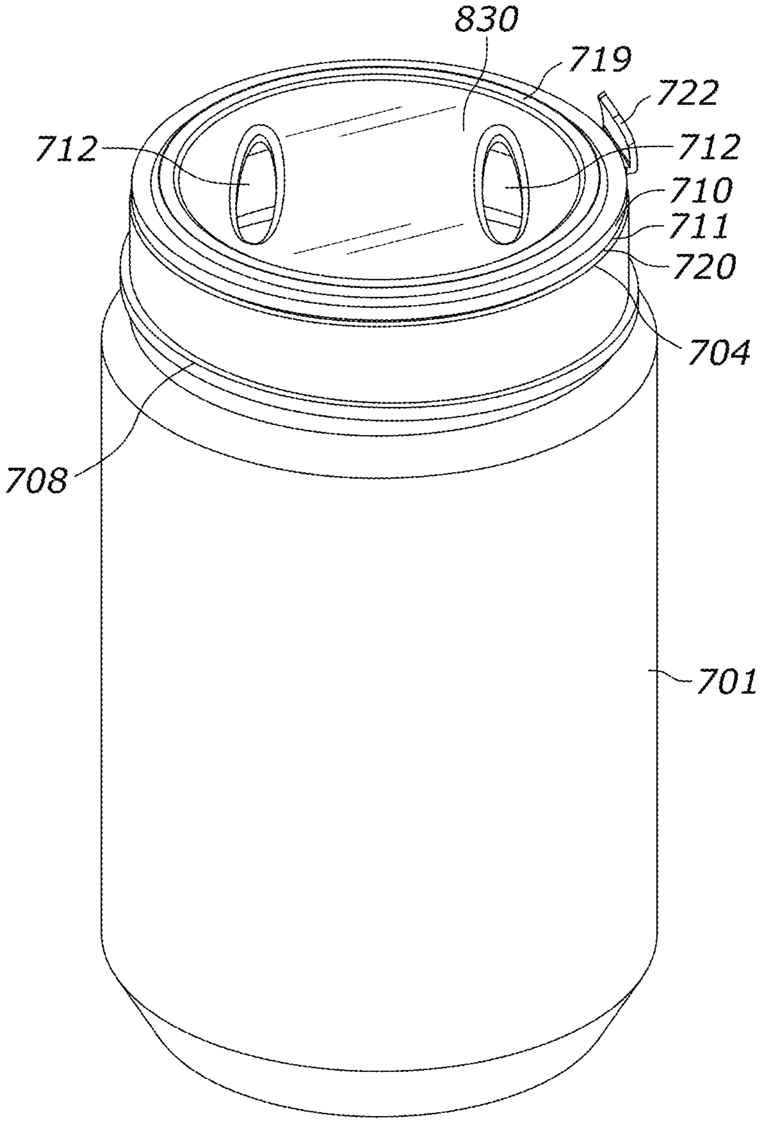
FIG. 9 illustrates a perspective view of the concentric handle held in a container according to the second variant in the second embodiment of the present inventions.

FIG. 9 illustrates a perspective view of the concentric handle held in a container according to the second variant in the second embodiment of the present inventions. A circular disc 710 is concentrically fit into a circular top mouth opening of a container 701. The container 701 has threads 708 that mesh with a threaded screw on lid. The circular disc 710 forms a handle for grasping by fingers of a user. The circular disc 710 has a pair of oval vent holes 712 and an integral spreader. A flexible membrane 830 is fixed over the vent holes 712. A protruding ridge 719 can be provided to mesh with the flexible membrane 830 and provide an air gap between the vent holes 712 and the flexible membrane 830. The circular disc 710 can have a concave top surface providing an air gap between the vent holes 712 and the flexible membrane 830. An upper outer flanged circular ring 711 is integrally formed in the circular disc 710 to prevent the circular disc from press fitting too deeply into the circular top mouth opening of the container.

A lower seal 720 is placed beneath the upper outer flanged circular ring and extends around a lower perimeter of the circular disc 710 positioned between the circular disc 710 and a top edge 704 of the circular top mouth opening of the container 701. The lower seal 720 can have a grab tab 722. The grab tab 722 has a fold to fit under the threaded screw on lid of the container 101. The fold of the grab tab 722 extends beyond an outer perimeter of the circular disc no further than a thread depth of the threaded screw on lid and threads 708 on the container to avoid interference when screwing the lid onto the container.

Figure 10:
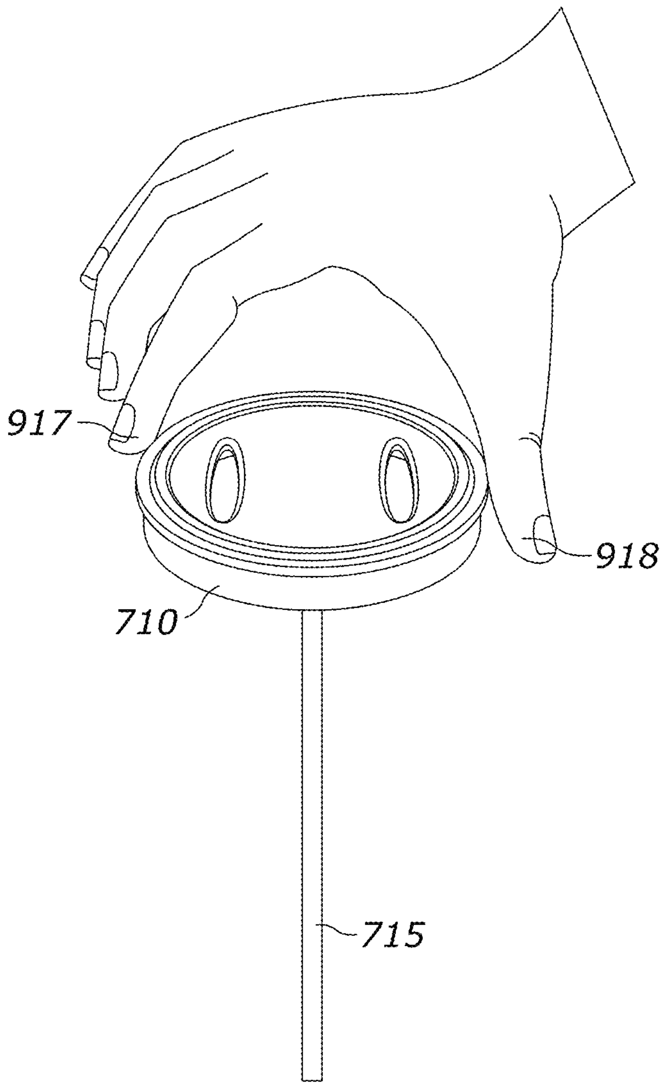
FIG. 10 illustrates a perspective view of the concentric handle formed by the circular disc with integral knife held between finger and thumb by a user according to the second variant in the second embodiment of the present inventions.

FIG. 10 illustrates a perspective view of the concentric handle formed by the circular disc with integral knife held between finger and thumb by a user according to the second variant in the second embodiment of the present inventions. A concentric handle is formed by an outer circumference of a circular disc 710. The circular disc 710 is held by an index finger 917 and thumb 918 of a user's hand as illustrated. The circular disc 710 has a spreader 715 of a substantially flat shape integrally formed in the circular disc 710 and downwardly extending from the circular disc 710 to a bottom tip of the spreader.

Figure 11:
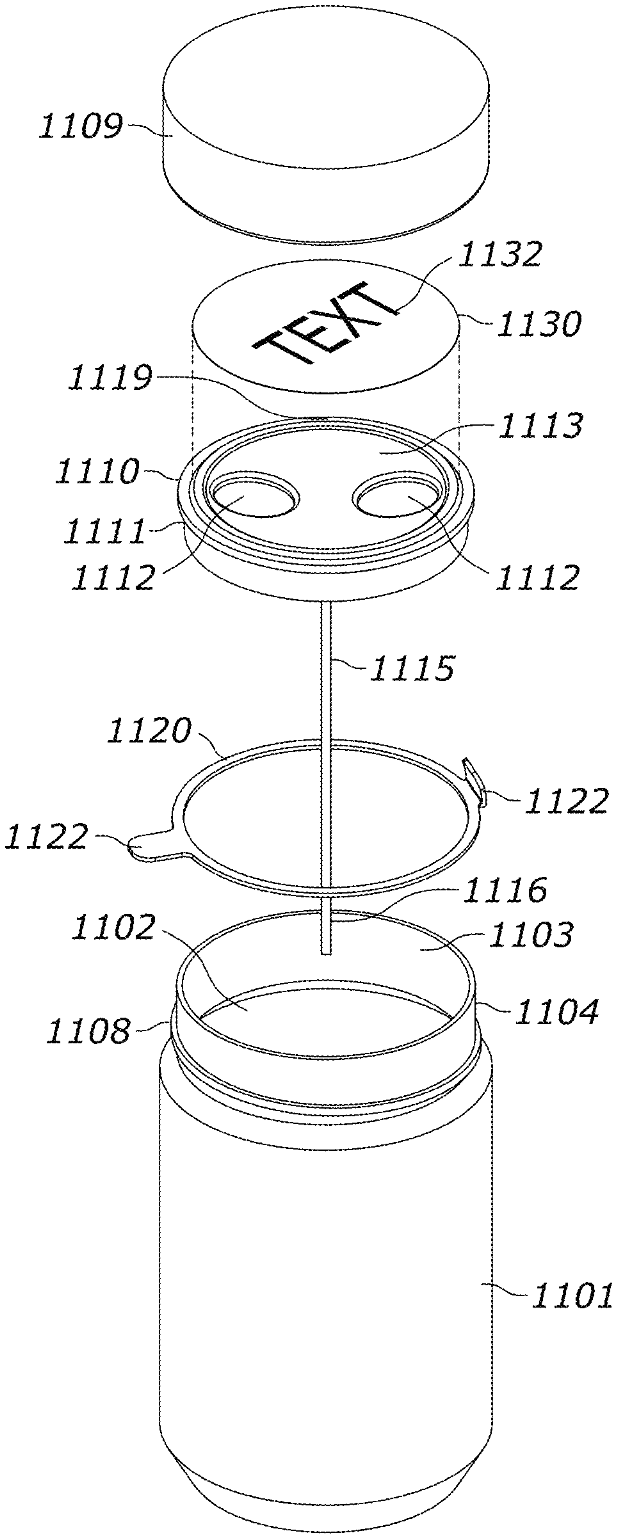
FIG. 11 illustrates an exploded perspective view of a concentric handle held in a container a third embodiment of the present inventions.

FIG. 11 illustrates an exploded perspective view of a concentric handle held in a container a third embodiment of the present inventions. A circular disc 1110 is concentrically fit into a circular top mouth opening 1102 of an inside annular surface 1103 of a container 1101. The circular disc 1110 is sized to be loosely fit into the circular top mouth opening 1102 of the inside annular surface 1103 of the container 1101. The container 1101 has threads 1108 and a threaded screw on lid 1109. An outside perimeter of the circular disc 1110 forms a handle for grasping by fingers of a user.

A spreader 1115 of a substantially flat shape is integrally formed in the same material as the circular disc 1110 and extends downward from the circular disc 1110 to a bottom tip 1116 of the spreader 1115.

An upper outer flanged circular ring 1111 is integrally formed with the circular disc 1110 to prevent the circular disc from press fitting too deeply into the circular top mouth opening 1102.

A lower seal 1120 beneath the upper outer flanged circular ring 1111 extends around a lower perimeter of the circular disc 1110 and is positioned between the circular disc 1110 and a top edge 1104 of the circular top mouth opening 1102 of the container 1101. The lower seal 1120 is beneath the upper outer flanged circular ring 1111 and extends around a lower perimeter of the circular disc 1110 and positioned between the circular disc 1110 and a top edge 1104 of the circular top mouth opening 1102 of the container 1101. The lower seal 1120 can have at least one grab tab 1122. The lower seal 1120 uses a sticky adhesive material. The lower seal 1120 can be a rubber or sticky food-grade material such as an FDA approved or food-grade adhesive. The lower seal 1120 can have an adhesive on both sides so as to create the seal. The lower seal 1120 material could be a PET, also known as polyethylene terephthalate, a type of thermoplastic polymer resin.

The lower seal 1120 can have a grab tab 1122. The grab tab 1122 can have a fold to fit under a threaded screw on lid 1109 of the container 1101. The fold of the grab tab 1122 can extend beyond an outer perimeter of the circular disc no further than a thread depth of the threaded screw on lid 1109 and the container 1101 to avoid interference when screwing the lid onto the container.

The circular disc 1110 has a pair of vent holes 1112.

A flexible membrane 1130 is fixed over the vent holes 1112. The flexible membrane 1130 can be a material based on polypropylene and coated or multi-material which have the approval of FDA or is food grade, and prevention of transmission of gases. The flexible membrane 1130 has a sticky lower part such as an FDA food approved or grade adhesive to stick to the top of the circular disc 1110. A protruding ridge 1119 can be provided to mesh with the flexible membrane 1130 and provide an air gap between the vent holes 1112 and the flexible membrane 1130. The circular disc 1110 can have a concave top surface 1113 providing an air gap between the vent holes 1112 and the flexible membrane 1130. The flexible membrane 1130 can alternately have a grab tab for breaking the seal.

The flexible membrane 1130 can have text artwork 1132 on a top surface of the flexible membrane 1130. Alternately the flexible membrane 1130 can be clear or opaque. While a primary purpose of the membrane 1132 is to create a safe and reliable vacuum seal, labeling helps too. By sealing, a user looks at permeation or transmission of gases though label. By being thin it can deform and stretch to show sealing effect, thereby indicating the food in the container is still safe to eat. The text artwork can be instructions for opening with the tabs or product branding graphics. A process that prints on the upper membrane can be preprinting the membrane prior to assembly could be hot stamping or pad printing. It can use in mold labeling to place a film insert on a spreader—a label that is molded in place making the spreader and label one much as one sees on containers such as butter packaging. The material in this case would need to be one that maintains a seal, thus the coating that one sees on a peanut butter jar or some other layer in the material. In-mold labeling (IML) is a labeling method in which a pre-printed decorative film is placed into a mold before the plastic container is shaped into that mold. Plastic pellets or resin are heated and placed into the mold where it merges with the label to create a single product.

Figure 12:
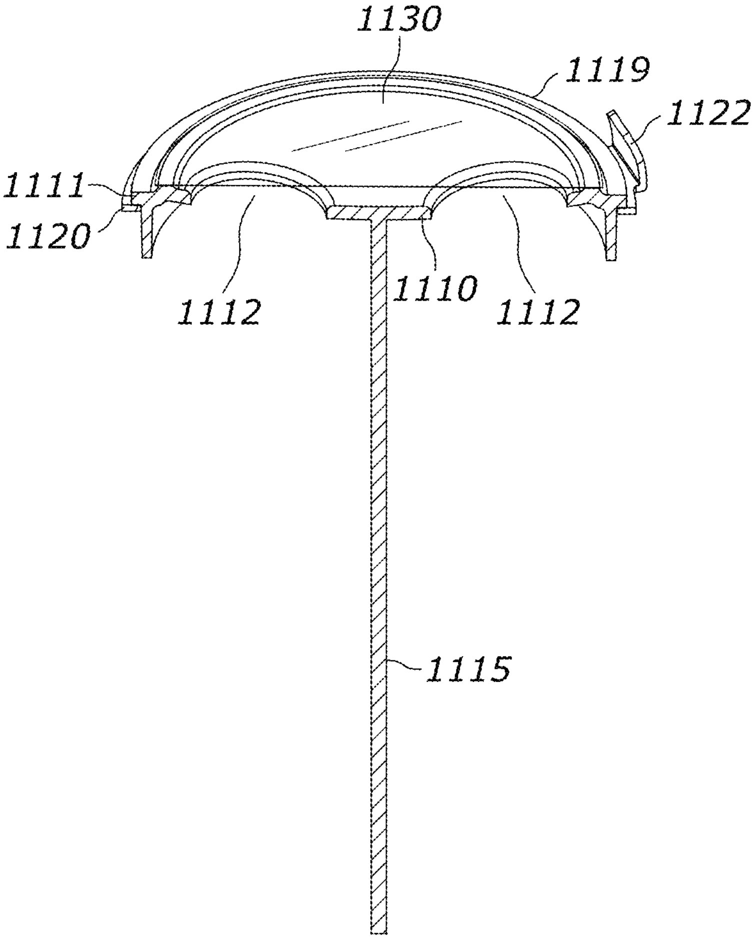
FIG. 12 illustrates a cutaway perspective view of the circular disc with integral knife according to the third embodiment of the present inventions.

FIG. 12 illustrates a cutaway perspective view of the circular disc 1110 with integral knife 1115 according to the third embodiment of the present inventions. A lower seal 1120 beneath the upper outer flanged circular ring 1111 extends around a lower perimeter of the circular disc 1110 and is positioned between the circular disc 1110.

The vent holes 1112 can be shaped two finger holes 1112. The flexible membrane 1130 can be fixed over the two finger holes. The tabs such as tab 1122 can be pulled by an index finger and thumb of a user's hand.

The circular disc 1110 can have a concave top surface providing an air gap between the vent holes 1112 and a flexible membrane 1130.

Figure 13:
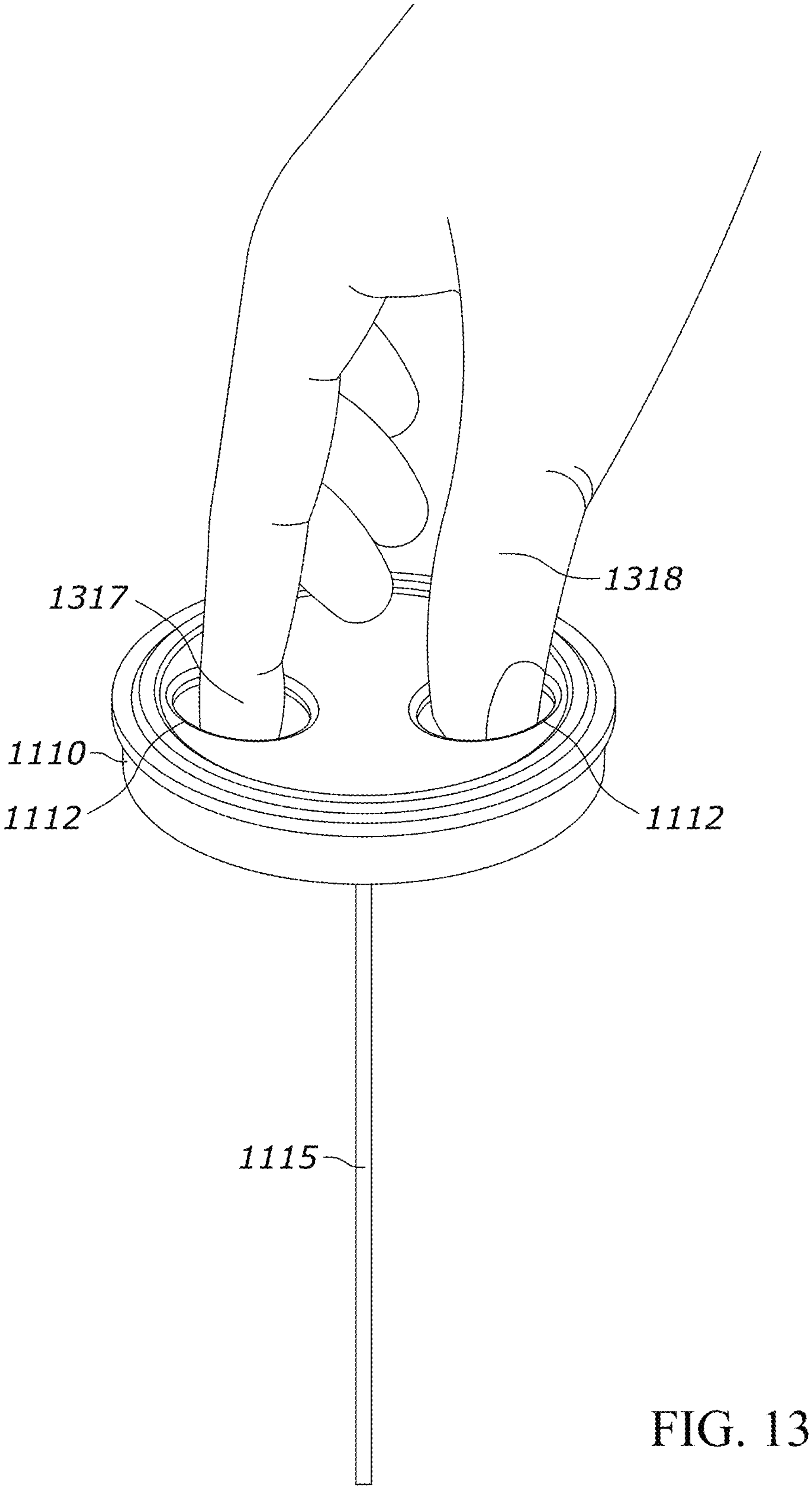
FIG. 13 illustrates a perspective view of the concentric handle formed by the circular disc with integral knife held between finger and thumb by a user according to the third embodiment of the present inventions.

FIG. 13 illustrates a perspective view of the concentric handle formed by the circular disc with integral knife held between finger and thumb by a user according to the third embodiment of the present inventions. The vent holes 1112 can be shaped two finger holes 1112. The two finger holes 1112 accommodate an index finger 1317 and thumb 1318 of a user's hand. FIG. 13 shows circular disc 1110 and spreader 1115. The tabs such as tab 1122 of FIGS. 11 and 12 can also be pulled by an index finger 1317 and thumb 1318 of a user's hand.

Figure 14:
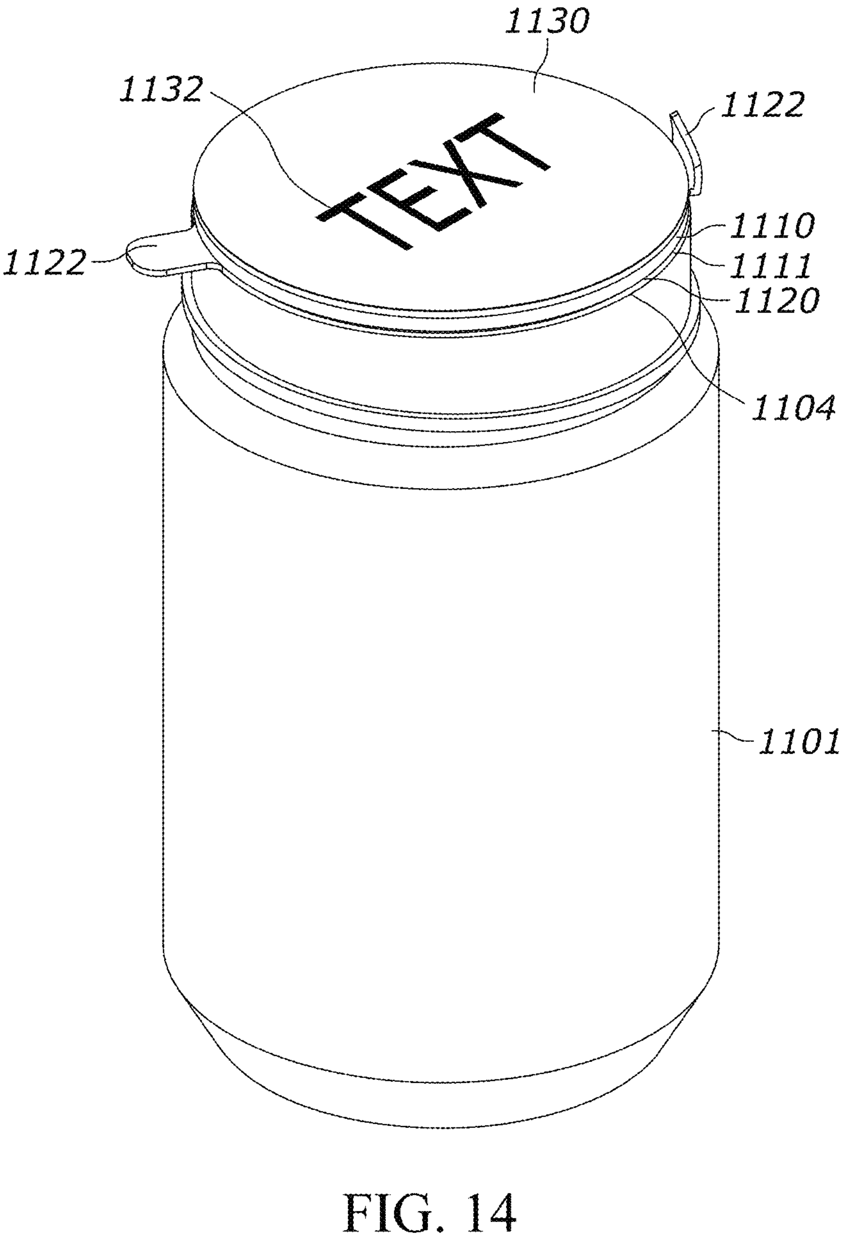
FIG. 14 illustrates a perspective view of the concentric handle held in a container according to the third se end-embodiment of the present inventions.

FIG. 14 illustrates a perspective view of the concentric handle held in a container according to the third embodiment of the present inventions. A circular disc 1110 is concentrically fit into a circular top mouth opening of a container 1101. The container 1101 has threads 1108 that mesh with a threaded screw on lid. The circular disc 1110 forms a handle for grasping by fingers of a user. The circular disc 1110 has a pair of oval vent holes and an integral spreader. A flexible membrane 1130 is fixed over the vent holes. An upper outer flanged circular ring 1111 is integrally formed in the circular disc 1110 to prevent the circular disc from press fitting too deeply into the circular top mouth opening of the container. A lower seal 1120 is placed beneath the upper outer flanged circular ring and extends around a lower perimeter of the circular disc 1110 positioned between the circular disc 1110 and a top edge 1104 of the circular top mouth opening of the container 1101. The lower seal 1120 can have a grab tab 1122. The grab tab 1122 has a fold to fit under the threaded screw on lid of the container 1101. The fold of the grab tab 1122 extends beyond an outer perimeter of the circular disc no further than a thread depth of the threaded screw on lid and threads 1108 on the container 1101.

Figure 15:
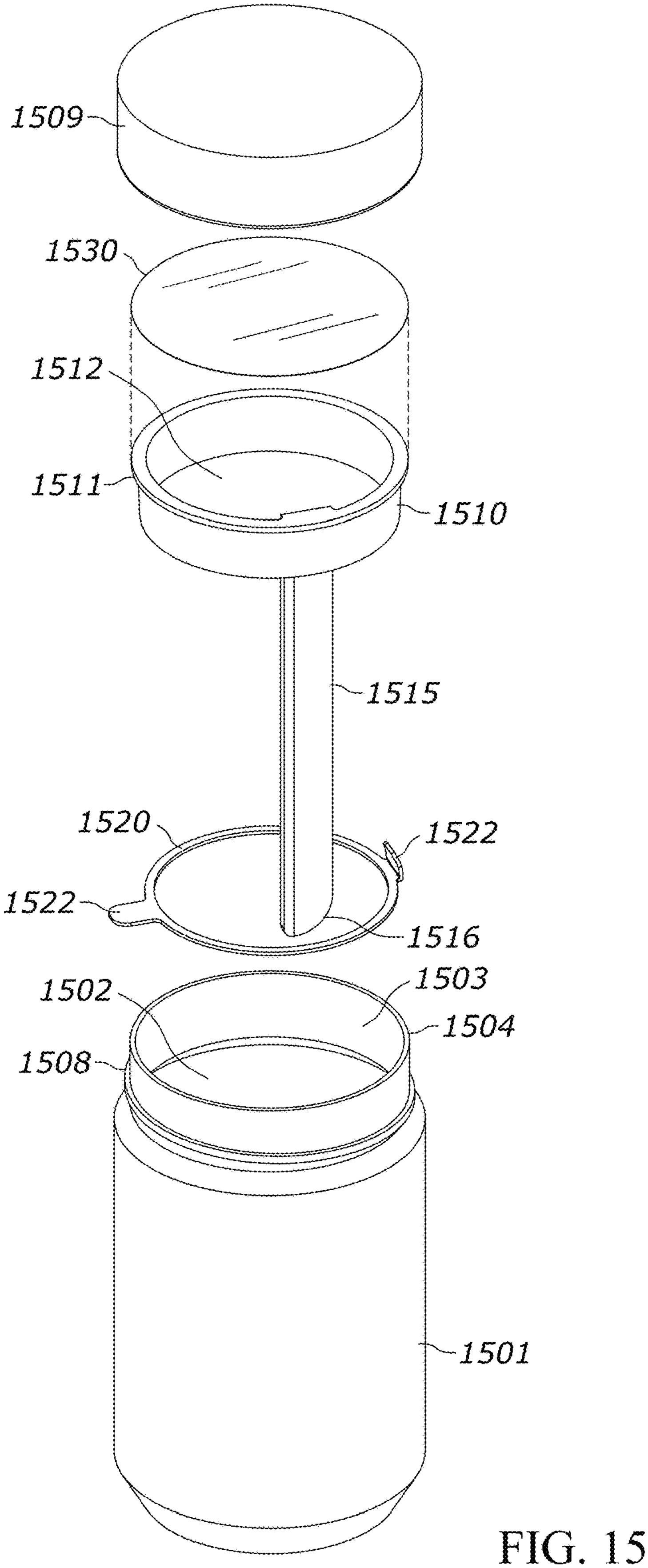
FIG. 15 illustrates an exploded perspective view of a concentric handle held in a container a fourth embodiment of the present inventions.

FIG. 15 illustrates an exploded perspective view of a concentric handle held in a container a fourth embodiment of the present inventions. A circular disc 1510 is concentrically fit into a circular top mouth opening 1502 of an inside annular surface 1503 of a container 1501. The circular disc 1510 is sized to be loosely fit into the circular top mouth opening 1502 of the inside annular surface 1503 of the container 1501. The container 1501 has threads 1508 and a threaded screw on lid 1509. An outside perimeter of the circular disc 1510 forms a handle for grasping by fingers of a user.

The circular disc 1510 is a ring that is one large vent hole 1512. The circular disc 1510 is an open ring 1512 with a spreader 1515 integrally formed extending below the open ring 1512. The spreader 1515 is a substantially flat shape and is integrally formed in the same material as the circular disc

1510 and extends downward from the circular disc 1510 to a bottom tip 1516 of the spreader 1515.

An upper outer flanged circular ring 1511 is integrally formed with the circular disc 1510 to prevent the circular disc from press fitting too deeply into the circular top mouth opening 1502.

A lower seal 1520 beneath the upper outer flanged circular ring 1511 extends around a lower perimeter of the circular disc 1510 and is positioned between the circular disc 1510 and a top edge 1504 of the circular top mouth opening 1502 of the container 1501. The lower seal 1520 is beneath the upper outer flanged circular ring 1511 and extends around a lower perimeter of the circular disc 1510 and positioned between the circular disc 1510 and a top edge 1504 of the circular top mouth opening 1502 of the container 1501. The lower seal 1520 uses a sticky adhesive material. The lower seal 1520 can be a rubber or sticky food-grade material such as an FDA approved or food-grade adhesive. The lower seal 1520 can have an adhesive on both sides so as to create the seal. The lower seal 1520 material could be a PET, also known as polyethylene terephthalate, a type of thermoplastic polymer resin.

The lower seal 1520 can have at least one grab tab 1522. The grab tab 1522 can have a fold to fit under a threaded screw on lid 1509 of the container 1501. The fold of the grab tab 1522 can extend beyond an outer perimeter of the circular disc no further than a thread depth of the threaded screw on lid 1509 and the container 1501 to avoid interference when screwing the lid onto the container.

A flexible membrane 1530 can be fixed over the vent hole. The flexible membrane 1530 can be a material based on polypropylene and coated or multi-material which have the approval of FDA approved or food grade, and prevention of transmission of gases. The flexible membrane 1530 has a sticky lower part such as an FDA approved or food grade adhesive to stick to the top of the circular disc 1510. The flexible membrane 1530 can also have a grab tab for breaking the seal. The tabs such as tab 1522 can be pulled by an index finger and thumb of a user's hand.

Figure 16:
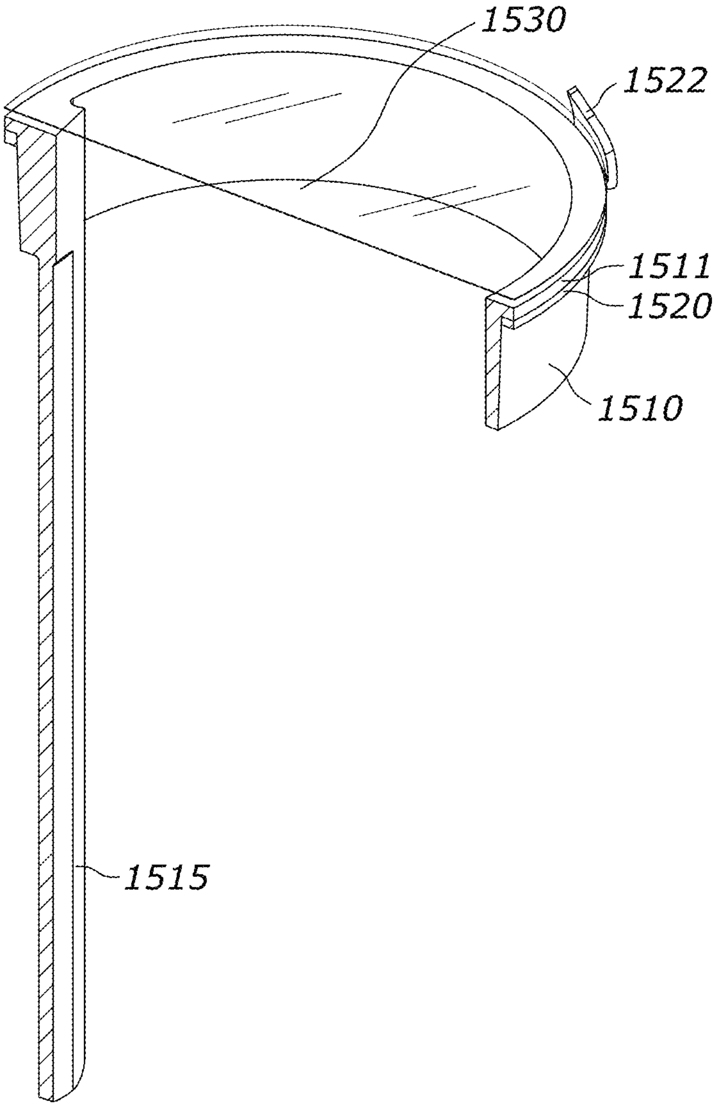
FIG. 16 illustrates a cutaway perspective view of the circular disc with integral knife according to the fourth embodiment of the present inventions.

FIG. 16 illustrates a cutaway perspective view of the circular disc 1510 with integral knife 1515 according to the fourth embodiment of the present inventions. The open ring is a vent hole. A lower seal 1520 beneath the upper outer flanged circular ring 1511 extends around a lower perimeter of the circular disc 1510 and is positioned between the circular disc 1510. The lower seal 1520 is beneath the upper outer flanged circular ring 1511 and extends around a lower perimeter of the circular disc 1510.

Figure 17:
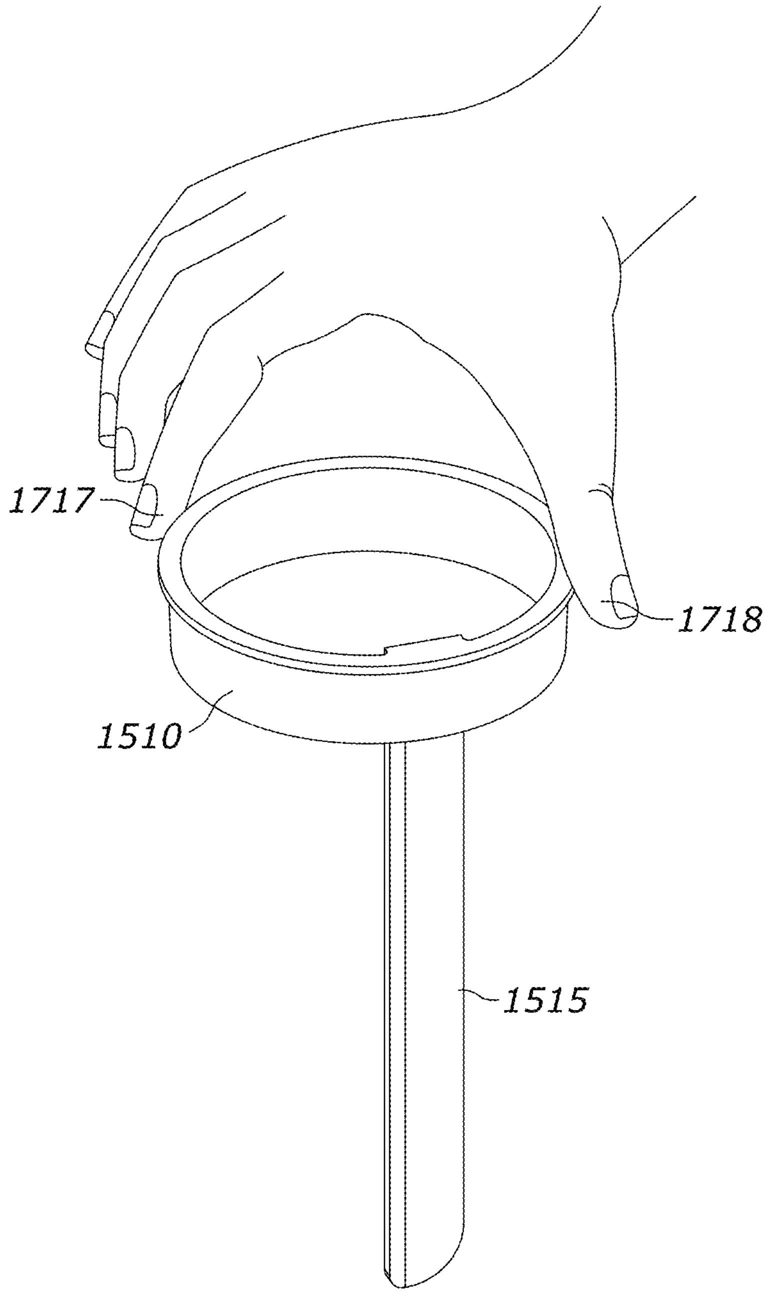
FIG. 17 illustrates a perspective view of the concentric handle formed by the circular disc with integral knife held between finger and thumb by a user according to the fourth embodiment of the present inventions.

FIG. 17 illustrates a perspective view of the concentric handle formed by the circular disc with integral knife held between finger and thumb by a user according to the fourth embodiment of the present inventions. The open ring is a vent hole. The outer circumference of the circular disc 1510 forms a handle to be grasped by an index finger 1717 and thumb 1718 of a user's hand. FIG. 17 shows the circular disc 1510 has an integrally formed spreader 1515. The tabs such as tab 1522 of FIGS. 15 and 16 can also be pulled by an index finger 1717 and thumb 1718 of a user's hand.

When a solid cover and some elastomeric material seals to the top of a jar, problems to be solved include distortion of jar, type of sealant, amount and thickness necessary, and set up time. Peanut butter is packaged in a PET type container that uses what some call a foil cover which is adhered to the top of the jar by some adhesive that joins the jar to the foil film. PET, also known as polyethylene terephthalate, is a type of thermoplastic polymer resin. The seal is present by the concave appearance of the top of the foil film to the jar, and by the fact that the cracking open or breaking of the foil film. It is thought that the material is packaged into the jar and the film/foil seal is applied, and that as the product cools the foil liner then gets sucked down into the jar to produce the concave appearance. It is not known what hold film/foil in place, and how quick the adhesive sets up. It appears good given jars inspected and the concave appearance of the film/foil on top of the jar. Basically shows that a seal is present to preserve contents.

In testing a jar was used of the type the product was designed for and a flexible film was also used. Hot water, of approximately 190 F was poured into the jar and the film was stretch over the opening. The initial results were that the film expanded creating a dome over the opening of the jar and over time as the water temperature cooled the dome structure reversed itself and the film was sucked into the jar similar to what one see's when buying a new jar of peanut butter. A seal was formed, by use of this flexible film, and a vacuum was created by the cooling of temperature, and that the seal of film to jar remained.

In another test a home canning lid was purchased and used with a larger plastic jar. It should be stated that the lid was rigid as it was from steel, and included a somewhat flexible gasket material on the perimeter of the lid. Again the initial test was to pour hot water into a jar, and place lid over it to see if by cooling the jar a seal would be formed. The initial test failed, as would be expected as no load was on lid, forming an initial seal. In the second test, a weight was added to the top of the lid to hold in place as to cause a seal initially from the gasketing material to jar rim. This in fact worked to a minor degree with the fluid and temperature used. But it was not enough to hold in place after a few hours of time has passed. In a third test with water in the range of 210 F and a heavier weight on the lid a great seal was achieved, but the down side was that the plastic jar material itself distorted. Distortion was possibly due to the weight and temperature used.

The conclusion is that with a rigid product to form a seal, the gasketing/adhesive must be soft enough to allow it seal, or heat and seal. The possible issue is that if the product is too stiff to accept the vacuum to be created that the jar itself could distort. Not knowing the volumetric shrinkage of the product in the jar and or the air volume left in the jar and what fill temperature it is not known if distortion would occur. It is also thought that the screwing on of the lid may aid in the seal, though it would need to be tested, much like canning.

The overall suggestion is to use an adhesive similar to what is on the foil liner today but to apply this to the outside ring of the product. This material shall need to be a bit thicker in application to compensate for the stiffness of the product. Meaning if any warpage occurs in product or that of the jar sealing surface the added adhesive can manage this mismatch. It may be necessary to use the jar lid to aid in compression initially of the product to the jar, much as in canning the ring holds the lid firmly to the glass jar to help provide the seal when all cools.

Unless stated otherwise, terms such as "first" and "second" are used to arbitrarily distinguish between the elements such terms describe. Thus, these terms are not necessarily intended to indicate temporal or other prioritization of such elements.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A concentric handle adapted to be held in a container, comprising:

a circular disc shaped to be concentrically fit into a circular top mouth opening of an inside annular surface of a container, the circular disc forms a grip for grasping by fingers of a user, and the circular disc comprising a spreader of a substantially flat shape integrally formed with the circular disc and downwardly extending from the circular disc to a bottom tip of the spreader; and an upper outer flanged circular ring integrally formed with the circular disc to prevent the circular disc from fitting too deeply into the circular top mouth opening, and a lower seal beneath the upper outer flanged circular ring and extending around a lower perimeter of the circular disc and positioned between the circular disc and a top edge of the circular top mouth opening of the container, wherein the lower seal comprises a grab tab.

2. A concentric handle according to claim 1, wherein the circular disc comprises a grab tab, wherein the grab tab has a fold to fit under a lid of the container.

3. A concentric handle according to claim 2, wherein the fold of the grab tab extends beyond an outer perimeter of the circular disc no further than a thread depth of the lid and the container.

4. A concentric handle according to claim 1, wherein the circular disc is composed of a vent-less solid disc.

5. A concentric handle adapted to be held in a container, comprising:

a circular disc shaped to be concentrically fit into a circular top mouth opening of an inside annular surface of a container, the circular disc forms a grip for grasping by fingers of a user, and the circular disc comprising a spreader of a substantially flat shape integrally formed with the circular disc and downwardly extending from the circular disc to a bottom tip of the spreader; and an upper outer flanged circular ring integrally formed with the circular disc to prevent the circular disc from fitting too deeply into the circular top mouth opening, and wherein the circular disc comprises a vent hole and a flexible membrane fixed over the vent hole.

6. A concentric handle according to claim 5, further comprising a lower seal beneath the upper outer flanged circular ring and extending around a lower perimeter of the circular disc and positioned between the circular disc and a top edge of the circular top mouth opening of the container.

7. A concentric handle according to claim 6, wherein the circular disc comprises a grab tab.

8. A concentric handle according to claim 6, wherein the lower seal comprises a sticky adhesive material.

9. A concentric handle according to claim 5, wherein the flexible membrane has text artwork on a top surface of the flexible membrane.

10. A concentric handle according to claim 5, wherein an upper surface of the circular disc has a protruding ridge meshing with the flexible membrane and providing an air gap between the vent hole and the flexible membrane.

11. A concentric handle according to claim 5, wherein the circular disc comprises a concave top surface providing an air gap between the vent hole and the flexible membrane.

12. A concentric handle according to claim 5, wherein the vent hole comprises two finger holes and the flexible membrane fixed over the two finger holes.

13. A concentric handle according to claim 12, wherein the flexible membrane comprises a grab tab.

14. A concentric handle according to claim 5, wherein an outside perimeter of the circular disc forms the grip for grasping by the fingers of a user.

15. A concentric handle according to claim 5, wherein the vent hole in the circular disc is an open ring with the spreader integrally formed extending below the open ring.

16. A concentric handle according to claim 15, further comprising a lower seal beneath the upper outer flanged circular ring and extending around a lower perimeter of the circular disc and positioned between the circular disc and a top edge of the circular top mouth opening of the container.

17. A concentric handle according to claim 16, wherein the flexible membrane comprises a grab tab.

18. A concentric handle according to claim 5, wherein the circular disc is sized to be loosely fit into the circular top mouth opening of the inside annular surface of the container.

* * * * *